United States Patent
Archer et al.

(10) Patent No.: US 11,032,090 B2
(45) Date of Patent: Jun. 8, 2021

(54) METHOD, SYSTEM, AND DEVICE FOR CHANGING THE COLLABORATION STATE FOR OMNI-WORKSPACES

(71) Applicant: Mitel Networks (International) Limited, London (GB)

(72) Inventors: Myles Archer, San Jose, CA (US);
Maura Higgins, Los Altos, CA (US);
Logendra Naidoo, Ottawa (CA)

(73) Assignee: MITEL NETWORKS (Int'L) Limited, London (GB)

( * ) Notice: Subject to any disclaimer, the term of this patent is extended or adjusted under 35 U.S.C. 154(b) by 0 days.

(21) Appl. No.: 16/666,154

(22) Filed: Oct. 28, 2019

(65) Prior Publication Data
US 2021/0126805 A1   Apr. 29, 2021

(51) Int. Cl.
*G06F 3/0481*   (2013.01)
*H04L 12/18*    (2006.01)

(52) U.S. Cl.
CPC ........ *H04L 12/1813* (2013.01); *G06F 3/0481* (2013.01)

(58) Field of Classification Search
CPC ............. H04L 12/1813; H04L 12/1822; H04L 12/1818; G06F 3/0481
See application file for complete search history.

(56) References Cited

U.S. PATENT DOCUMENTS

| | | | |
|---|---|---|---|
| 2005/0015444 A1* | 1/2005 | Rambo | H04N 7/155 709/204 |
| 2009/0019367 A1 | 1/2009 | Cavagnari et al. | |
| 2013/0091440 A1* | 4/2013 | Kotler | G06Q 10/10 715/753 |
| 2016/0112476 A1 | 4/2016 | Gudipaty et al. | |
| 2016/0127428 A1* | 5/2016 | Flunkert | G06Q 10/101 715/753 |
| 2016/0255126 A1* | 9/2016 | Sarris | H04N 7/155 348/14.08 |
| 2017/0277696 A1* | 9/2017 | Sekharan | H04L 65/403 |
| 2017/0279860 A1* | 9/2017 | Agarwal | H04L 65/80 |
| 2018/0302233 A1* | 10/2018 | Viera | H04L 12/1818 |

OTHER PUBLICATIONS

Cristian Gadea et al., Finger-Based Gesture Control of a Collaborative Online Workspace, May 1, 2012, IEEE Computer Society, pp. 1-6 (Year: 2012).*

Laura Kiss et al., The connection of the style of interactions and the collaboration in a virtual work environment, Feb. 12, 2016, IEEE Computer Society, pp. 1-4 (Year: 2016).*

* cited by examiner

*Primary Examiner* — Tam T Tran

(57) ABSTRACT

Systems and methods for communications are disclosed. The systems and methods establish a communication between at least a first user device and a second user device. Additionally, the systems and methods transfer information between at least the first user device and the second user device within the communication. The systems and methods also present a representation of collaborative content to the first user device and the second user device. Additionally, the systems and methods receive a first user input from the first user device during the communication and receive a second user input from the second user device during the communication. The systems and methods also update the collaborative content during the communication based on the first user input and the second user input.

20 Claims, 8 Drawing Sheets

METHOD, SYSTEM, AND DEVICE FOR CHANGING THE COLLABORATION STATE FOR OMNI-WORKSPACES

FIELD OF THE INVENTION

The present disclosure generally relates to methods and systems for communication. More particularly, the disclosure relates to communication methods and systems for collaboration between users.

BACKGROUND OF THE DISCLOSURE

Electronic communications, such as audio and video conference sessions are often used to allow participants in discussions from various locations to "virtually" participate in a conference in real-time. Such communications allow participants in different locations to participate in discussions without having to travel to a common location. Furthermore, such communications may allow participants to collaborate to a limited extent. However, collaboration during such conference calls is limited. For example, during a conference call, two or more users may discuss a topic. One of the users, the "presenter," may present information, such as a document, to the other users. The document may be open on the presenter's computer. Accordingly, the presenter may allow the other users to see the document by "sharing" the user's computer desktop. Sharing a computer desktop may be a process that allows a first user to allow other users to see the first user's computer desktop on each of the other user's respective computer monitors. However, the users may not be able to collaborate directly on achieving a goal related to the user's tasks to be performed.

For example, when the collaboration includes editing a document, because the document may be open on the presenter's computer, the presenter may generally make changes to the document. The other users are not able to directly make changes while the first user is in the document. Rather, these users are only viewing a representation of information on the first user's monitor. Accordingly, for another user to make changes, the first user has to exit the document and another user has to open the document on that user's computer. It may be preferable for users to be able to collaborate more directly. For example, it may be preferable for each user on a conference call to be able to change the document more directly. Accordingly, systems, methods, and devices for collaboration during conference calls or other communications are desired.

Any discussion of problems provided in this section has been included in this disclosure solely for the purposes of providing a context for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

Figure 1:
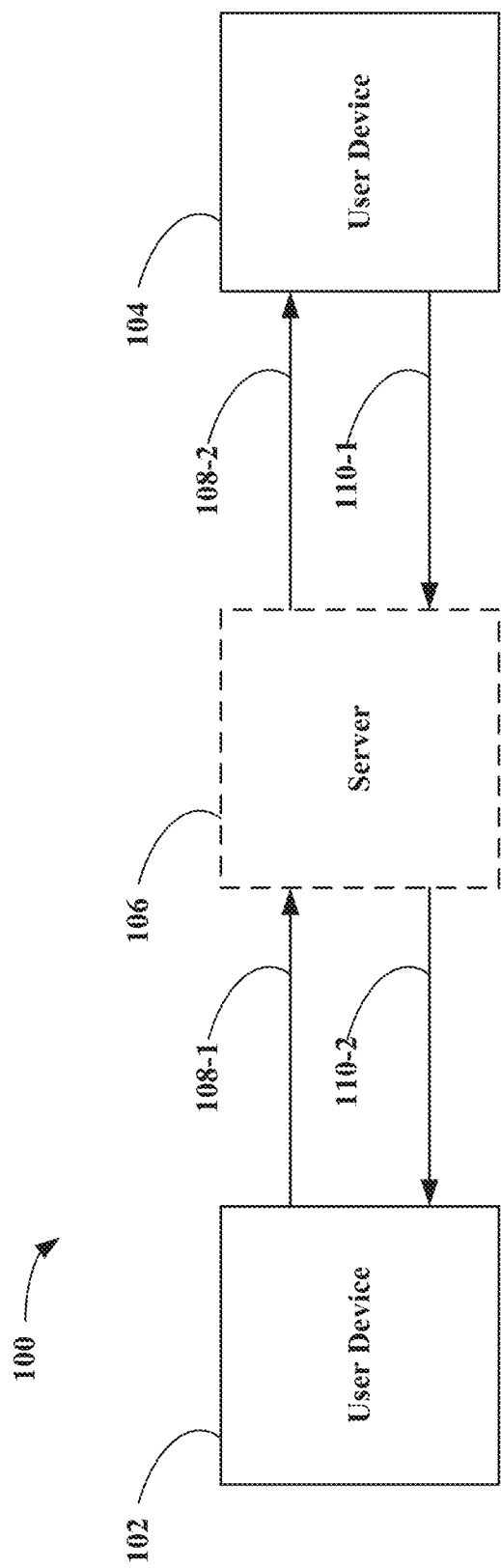
FIG. 1 is a diagram illustrating a communication workspace system in accordance with exemplary embodiments of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure provide systems, methods, and devices for conferencing that may allow for updating of collaborative content during a communication. Implementations of collaboration-focused applications may leverage multiple media types, for example, audio, video, and online text (e.g., chat). When the collaborating participants dial into a conference bridge, the collaborating participants may be joined together in one conference call. The subject or title of the call may indicate a particular topic or purpose. The agenda or set of topics to be discussed may be listed in the invitation as may be customary when running a project (e.g., agenda, bullet points, and a descriptive passage of text such as "meeting purpose"). Many projects may include multiple members who may be working on tasks such as developing code, writing documents, creating presentations, or other tasks related to the project. The tasks may generally be related to understanding aspects of the session's goal or purpose and may be related to resolving a problem related to the session's goal or purpose.

A workgroup may be referred to as "a logical collection of computers that share resources." Expanding on the definition, a workgroup may be formed to achieve a purpose. The purpose of the workgroup may be added to the definition, e.g., "a logical collection of computers that share resources, the logical collection of computers used to attain a particular purpose." The work-related goals of a workgroup are typically unknown by the workgroup's members. In other words, people may not always be aware of what their specific purpose or the purpose of a workgroup they are in is. Knowing why a workgroup comes together and for what purpose may be important to attaining the goals of the workgroup.

For example, when a workgroup is set up to review a specific project, it may be helpful for the members of the workgroup to know the purpose of the workgroup. For example, when the members of the workgroup know the purpose of the workgroup in advance, the members of the workgroup may more quickly orient themselves to the tasks of the workgroup because discussion time will not need to be spent discussing why a workgroup is being set up. Furthermore, because the people actively participating in a workgroup may be dynamic, knowing the purpose of the workgroup up front may allow members of the workgroup to join ongoing activities specifically when ideas occur to them related to the task of that work group. For example, if a workgroup is set up to review progress on the specific project, the members of the workgroup may know to review their own personal progress on the project and provide that information within the workgroup, without having to be prompted or having to discuss the preparation.

Similarly, when a workgroup is set up to review code, for example, the members of the workgroup may be more productive when they know in advance the specifics of the project, e.g., the code that is being reviewed, what the function of the code being reviewed, and other aspects of the code. Knowing specifics about the code to be reviewed may allow members of the workgroup to prepare for interactions within the workgroup, have time to contemplate the task to be performed by the code, have time to review the code interpedently from the workgroup to prepare, or take other steps to prepare to interact collaboratively within the workgroup. Furthermore, workgroup members may be more effective when the members of the workgroup understand the goals of the workgroup. In the context of the systems and methods described herein, a working definition of a workgroup may be "a logical collection of computers that share resources and have a common purpose in the minds of the users of the collection of computers."

During a project's lifecycle, numerous meetings may be called. For the meetings, an invitation to one or more workers, e.g., a subset of the workers of a larger workgroup, may be sent. Within such a workgroup, only those who are invited can converse with the participants. For example, people who have been invited may converse, e.g., perhaps through an audio session or a video session. In another example, once connected in a conference session, the ability to chat online may be provided. The other work-team members may be working on other files, documents, computer code, or some other materials related to a goal of the workgroup. Communicating with workgroup members may not be done in a unified manner in some cases. For example, communicating with workgroup members may not be done in a unified manner because the workgroup members may be working independently. Furthermore, the workgroup members may not be part of the principal discussions, e.g., from before a conference call underway.

The above-mentioned dynamic that underpins traditional conference calls within a project-team context (or workgroup) is severely limited in that the session's state is controlled by the meeting organizer, which is related to when the call is scheduled to occur. Often the participants in that call themselves determine when the call is over by either dropping off during the call, at the end of the call, or by stating words to the effect "we're not done yet . . . let's please stay on the session until we resolve Task X" or " . . . simply discuss Topic Y." Moreover, session state control may be more of an informal action on the part of the participants that determines the outcome, e.g., by asking questions such as, "are we done yet?"

The communication session's start and stop may be based on the parameters shared in the invitation. The session's status may be at the discretion of the organizer or participants. For example, the organizer or participants may determine when a session is over.

Furthermore, conference calls may often link to a shared folder. Files deemed relevant to that cause may be static, however. In other words, some files may not be dynamic in the collaborative sense. Files that are not simply shared in static fashion may require a user, e.g., on the conference call, first be permitted access to view the files. For example, files that are not static may require a user to be permitted access to see them from a user that already has access. Furthermore, the files may not be the element of a truly collaborative session. In other words, the files may not actually be the product of people working on a task together (within the files) (i.e., collaborating). Examples of activities that may result in collaborative materials from a collaborative session may include, but are not limited to updating a file, solving a problem in real-time, creating a flowchart, creating a strategy, prioritizing a list, or some combination of these.

Files deemed relevant to a conference session may be separate from the conference experience. For example, users may collaborate on an issue while referring to files without collaborating on writing or modifying the files themselves. Accordingly, the files referred to may be independent of the collaboration environment itself. For example, a link to SharePoint, Google drive, or other file sharing mechanism may provide access to a file or files independent of collaborating on those files, e.g., in real-time. Meaning, the desired user experience for a conference call is much less of a workspace related session and is geared more towards a session for the purpose of communicating, e.g., "let's talk until we end the call at the designated time or if we have a reason to end it early." For a conference call, communicating has traditionally been the focus rather than measured outcomes or working collaboratively on a project, event, or another joint task.

A workspace may be described as a digital space where users work using a technology framework that includes content, applications, and possibly a dashboard or desktop-like user-experience. Often touted as a workforce-enablement utility, workspaces leverage multiple technologies that may otherwise be disparate.

FIG. 1 is a diagram illustrating a communication workspace system 100 in accordance with exemplary embodiments of the disclosure. The communication workspace system 100 may include a user device 102, a user device 104, and, optionally, a server 106. The user device 102, 104 may be a communication device including a processor and a memory. The memory may be a tangible, non-transitory memory configured to communicate with the processor. The tangible, non-transitory memory may have instructions stored thereon.

An exemplary embodiment offers an enhancement to the digital workspace construct for a workgroup that goes beyond file-sharing spaces and managing the respective users. Described as an omni-workspace, or a workspace that may encompass all group members, the omni-workspace may embody multiple participants with a common goal such as a project, a task or tasks, or an event. Thus, the proposed goal-oriented work environments (or workgroups) may allow collaboration between members for the purpose of communicating while working on that common goal. For example, the proposed goal-oriented work environments (or workgroups) may allow collaboration between members over the user devices 102, 104 for the purpose of communicating while working on that common goal. In an example embodiment, the user devices 102, 104 may communicate directly. In another example embodiment, the user devices 102, 104 may communicate through a server. In either embodiment, users may collaboration for the purpose of communicating while working on that common goal.

A project team in an omni-workspace setting may want to add participants from another workspace. In some aspects, adding participants from another omni-workspace may allow for more effective collaboration on their respective goals. For example, the participants may collaborate more effectively on their respective goals when a seamless method of connecting the users is provided. Accordingly, in an exemplary embodiment, a seamless method of connecting the users through a simple over-arching invitation (e.g., similar to a conference invitation) may be provided. Furthermore, the omni-workspace may also provide a view of the ongoing developments and interactions between users so that everyone may get a sense of the progress on individual work-related tasks being performed by each workgroup member.

As discussed herein, the ability to apply an "omni-conferencing" user-experience to a digital workspace does not exist today. "Omni" refers to combining the form (e.g., "workspace") so that the omni workspace may be an embodiment of "all" things. In other words, the omni-workspace may generally allow all members to interact with all other members on all the tasks that may be collaborated on within the omni-workspace. There may be exceptions, however. For example, in some cases sensitive information may have limited visibility.

Allowing all members to interact with all other members on all the tasks that may be collaborated on within the omni-workspace may enhance the collaboration experience for participants. The collaboration experience may be enhanced because the most relevant resources that make up the work-related environment (e.g., media files, documents, presentations, work in progress, and other data within the workspace) may exhibit presence characteristics that may be similar to people (e.g. Bob is out of the office; the document being edited by Bob and Sally; Bob is in a conference call with Jim; all users may see the coding that Bob is in the middle of executing).

Shortcomings exist with existing repository environments (such as file-share spaces) where the existing repository environments simply provide file-sharing capabilities and do not provide robust ways to communicate. Digital workspace constructs may offer a way to collaborate real-time and possibly chat, such as via text messages, however digital workspace constructs do not typically support a conferencing capability for its users. For example, Microsoft Share-Point provides the ability to file-share, however it is not possible to invite a set of shared-purpose users to work on the same file together, communicate in a conference environment, allow real-time chat and then apply a change in state to that environment. A change in state to the environment may include but is not limited to (1) transferring the workspace to another workspace or (2) adding in another digital workspace environment. The digital workspace environment may be replete with the digital workspace's voice-mail members (e.g., similar to a conference function; a digital workspaces' voice-mail members applies to voice calls, however). Other changes to the collaborative state may be possible.

Furthermore, the shortcomings mentioned are further demonstrated by the fact that current collaboration utilities do not permit conference-like enablement on a workplace scale where the communication by the users and the user's dynamic content across a common purpose may be transmitted. For example, Microsoft Skype, Join.Me, Cisco Web-Conferencing, and Mitel MiCollab and Teamwork do not permit conference-call capabilities support on a workplace scale wherein the communication by all the users and their work-related content is shared with a common purpose.

In a standard conference call, a person talks to several people at the same time. In an omni-workspace collaboration session, the session may be defined by the workgroup's mandate. Workgroup members may generally talk to other workgroup members simultaneously. Generally, all members may see the respective work files that are being worked on in real-time (e.g. "Zoe is editing in real-time;" "Tristan is editing in real-time." However, only users granted permission using a particular web-link once they gave been granted permission by the "Owner" are invited to edit in real-time. Furthermore, the work being performed on a file is still private because other members within the same workgroup are not afforded the same privilege to edit in real-time, nor are they even allowed to communicate within the same digital space exemplified as a file-sharing space. Generally, no one's work is private when the work falls within the proposed omni-workspace concept.

The omni-workspace may be a virtual workspace, a virtual construct for putting forth collaborative efforts to accomplish a goal. A primary view may illustrate a collaboration session that may be underway. Accordingly, there may be no, or fewer missed meetings because everything that is going on may be viewed by the users. Thus, members may be much less likely to miss a relevant subject-matter call because sessions may be monitored by everyone. Generally, personal privacy, at least with respect to omni-workspace related tasks, may not be relevant in the omni-workspace environment. The omni-workspace may be governed by a common purpose or goal, for example, an AGILE Sprint. AGILE is a project management tool. A Sprint is a set period during which specific work needs to be completed and made ready for review.

The state, i.e., active or non-active, may be determined by a session initiator, e.g., a project lead, a prime, or some other initiator. All workgroup members may be assigned tasks with progress indicators. In an exemplary embodiment, when the progress for the members, e.g., all the members, is 100%, the session may be completed. Accordingly, the session initiator may transfer the dynamic state to another workgroup. Once the state is transferred, new members may be able to interact or perform other activities of an omni-workspace. However, previous workgroup members may be absolved of any measurable tasks. The session initiator may invite another workgroup (e.g., like a conference function).

Once the state is invited, new members may be part of a new workgroup as defined by the session initiator. Members may then interact with their new workgroup members and collaborate on new tasks or receive individual tasks having a same progress indication. The omni-workspace may also have certain applications running in the container-like environment. Accordingly, members may view the applications running within that workspace in addition to viewing the tasks and viewing what each member is working on. In an aspect, all members may view all the applications running within that workspace An exemplary embodiment provides omni-workspaces and may include one or more elements such as (1) users with a common purpose, (2) a plurality of means to communicate, (3) content to facilitate the collaboration-session, and (4) a common field of relevance such as a display with multiple presence indicators for users and content. For example, users with a common purpose may communicate over user devices 102, 104, e.g., with or without a server 106. The user devices 102, 104 may provide for text, audio, and/or video communication as well as for the display of documents or other files to facilitate the collaborative-session. The user devices 102, 104 may also provide or connect to the display (s) with multiple presence indicators for users and content and provide the indicators and content driving such display (s).

Some previous solutions in this digital technology-space focus on functions that may be individually separated such as the ability to enter a chat session to communicate during a file-sharing session (e.g. SharePoint). Other previous solutions may include shared-editing sessions (e.g. Excel Online). In another example, an Amazon digital workspace, for example, is defined as "a managed desktop computing service in the cloud" that "removes the burden of procuring or deploying hardware or installing complex software and delivers a desktop experience." Such environments are not capable of being able to handle phone calls typically, nor are they equipped to facilitate the typical features provided for a communication system (e.g., hold, conference/transfer, etc.)

Conducting a conference call using a separate mode of communication while sharing your screen with virtual content such as a file directory is a demonstration of a workaround approach in the absence of a fully capable method (e.g., conference or transfer) to collaborate and communicate within the same facility. Files may be shared within the virtual workspace as with an Amazon Virtual Private Cloud (VPC). File sharing spaces offer the ability to communicate using chat-based sessions, however certainly no ability to conference in or transfer the voice communications. Voice communications are typically not offered in typical file-sharing spaces.

Conferencing today is limited to audio in the industry standard case of conference/transfer. Therefore, expanding the definition of conference/transfer to an entire workspace is considered in the present invention. Furthermore, the workspace construct expands the purpose of a collaboration session to include highly interactive, collaborative digital spaces that encompasses content and communication.

An exemplary embodiment may apply a collaborative state to an omni-workspace that goes well beyond the traditional digital workspace construct. For example, "conferencing" in another workspace or transferring to another workspace that may include workspace-specific content and a common purpose or goal may allow members to communicate in the following manners. First, a communication session may include a common workgroup of users. Second, editing or viewing digital content capabilities that are specific to an omni-workspace may be possible. For example, editing or viewing of real-time collaboration, recording tasks, sharing output, reviewing workflow, viewing primary vs. secondary views, or processing omni-workspace data may be possible. Third, each workspace member may be an active collaborator interacting with the content (e.g., a typical project team). Finally, a workspace-based communication session that may be underway may include both the workspace's users and content. For example, in an aspect, a workspace-based communication session that may be underway may include all the workspace's users and content.

Accordingly, the enhanced call-principle may apply to a workspace making it possible to apply certain functions to leverage collaboration within a workgroup. A collective approach to handling the communications for a workspace or a workgroup ensures relevant individuals, content, and other related materials are opted in by the system to allow for collaboration when needed (e.g., "conference the Bluetooth team in").

An exemplary embodiment may make it easy to add in most relevant users applying a conference-call concept, however the ability to conduct project work simultaneously within the workspace may be supported as well.

Figure 2:
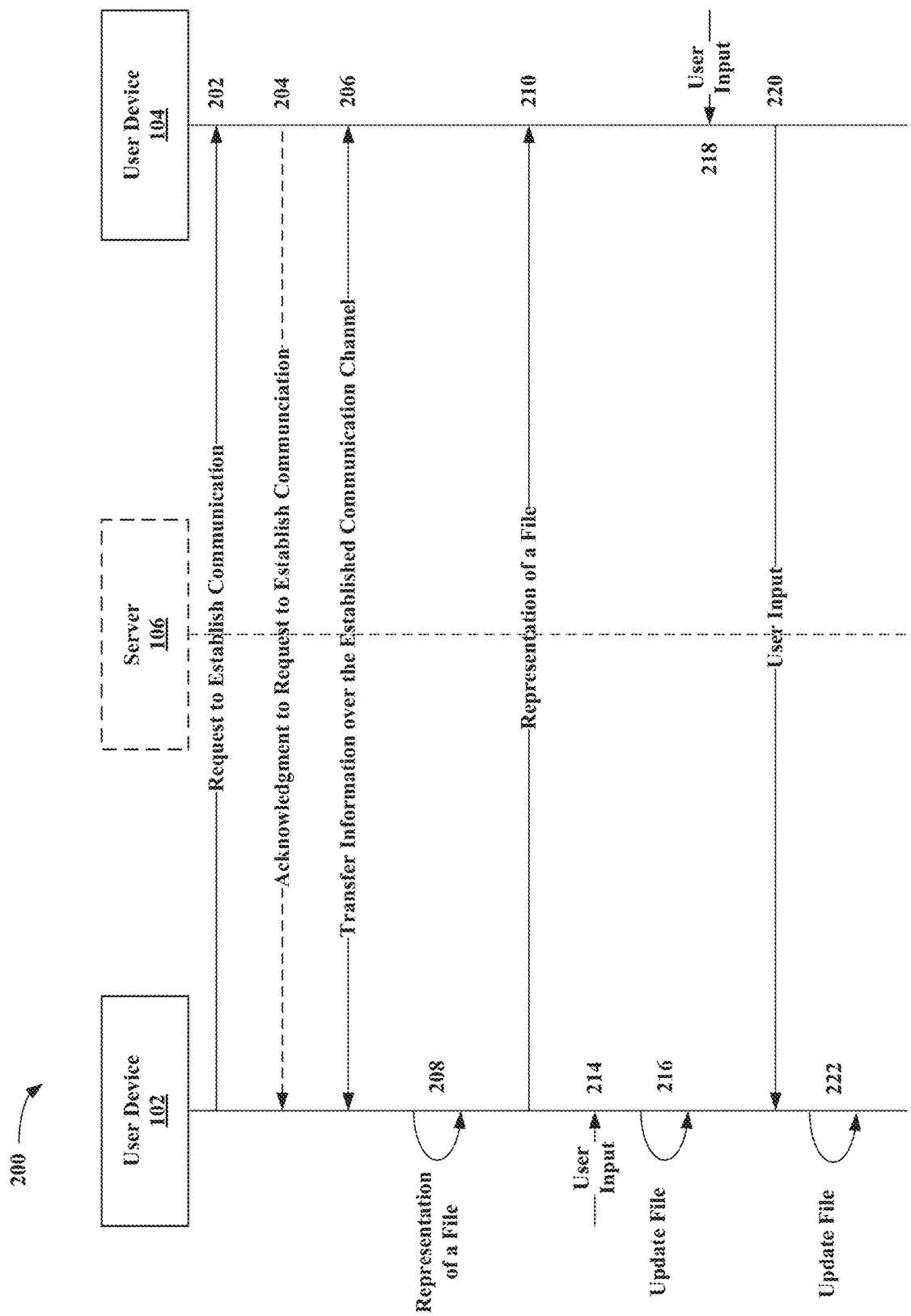
FIG. 2 is a diagram that illustrates a call flow in accordance with exemplary methods of the disclosure.
Figure 3:
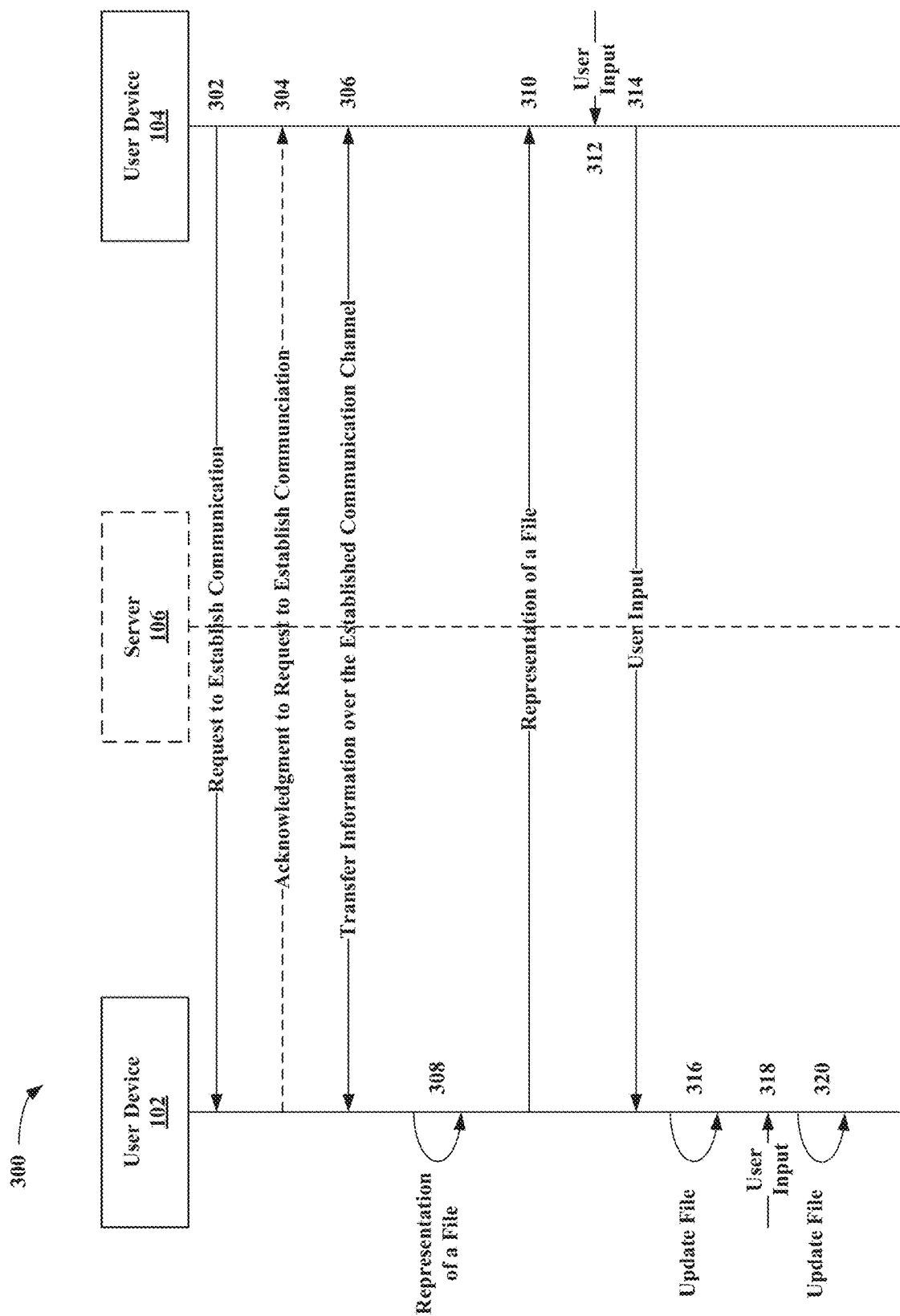
FIG. 3 is another diagram that illustrates a call flow in accordance with exemplary methods of the disclosure.
Figure 4:
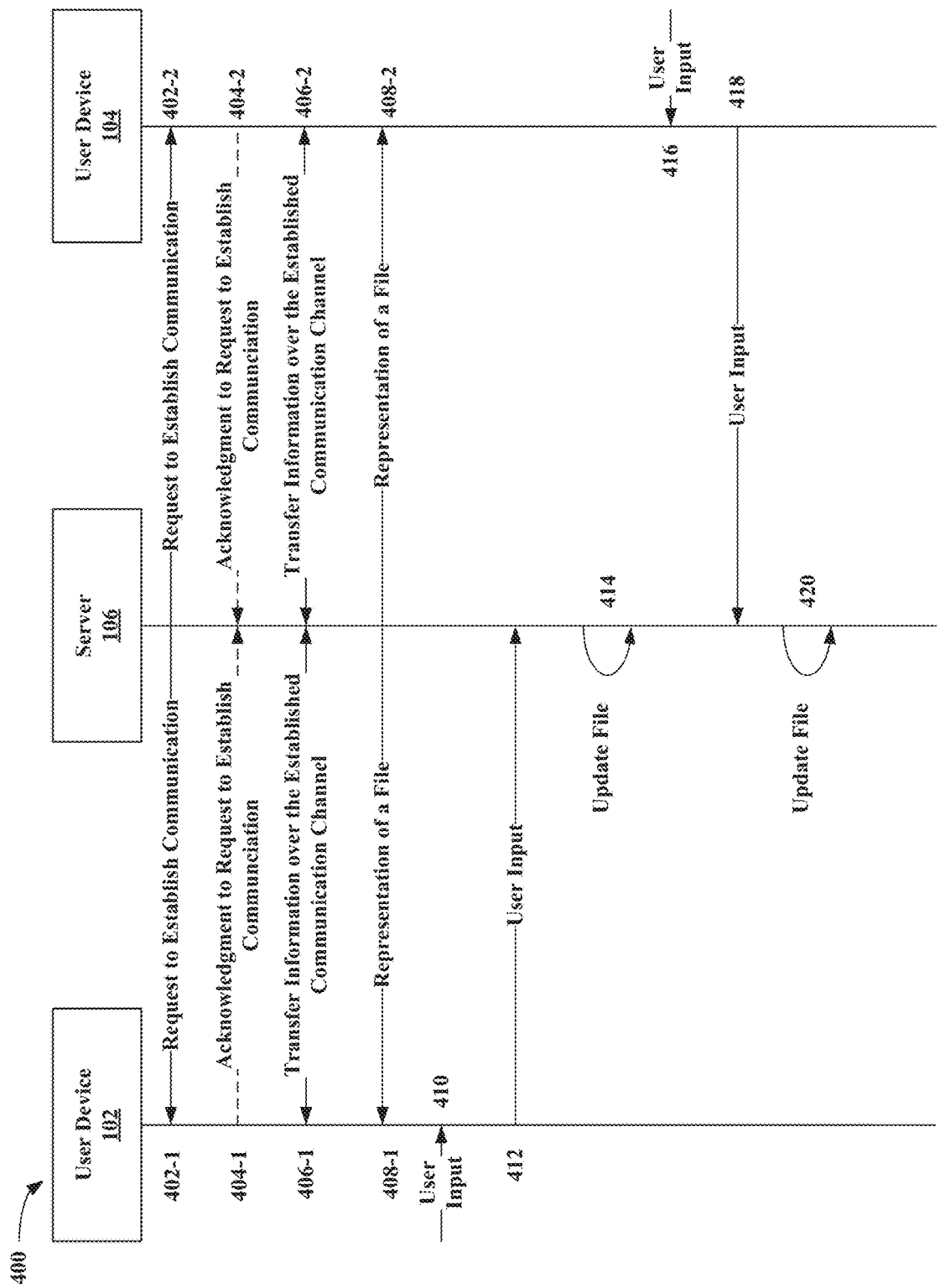
FIG. 4 is another diagram that illustrates a call flow in accordance with exemplary methods of the disclosure.
Figure 5:
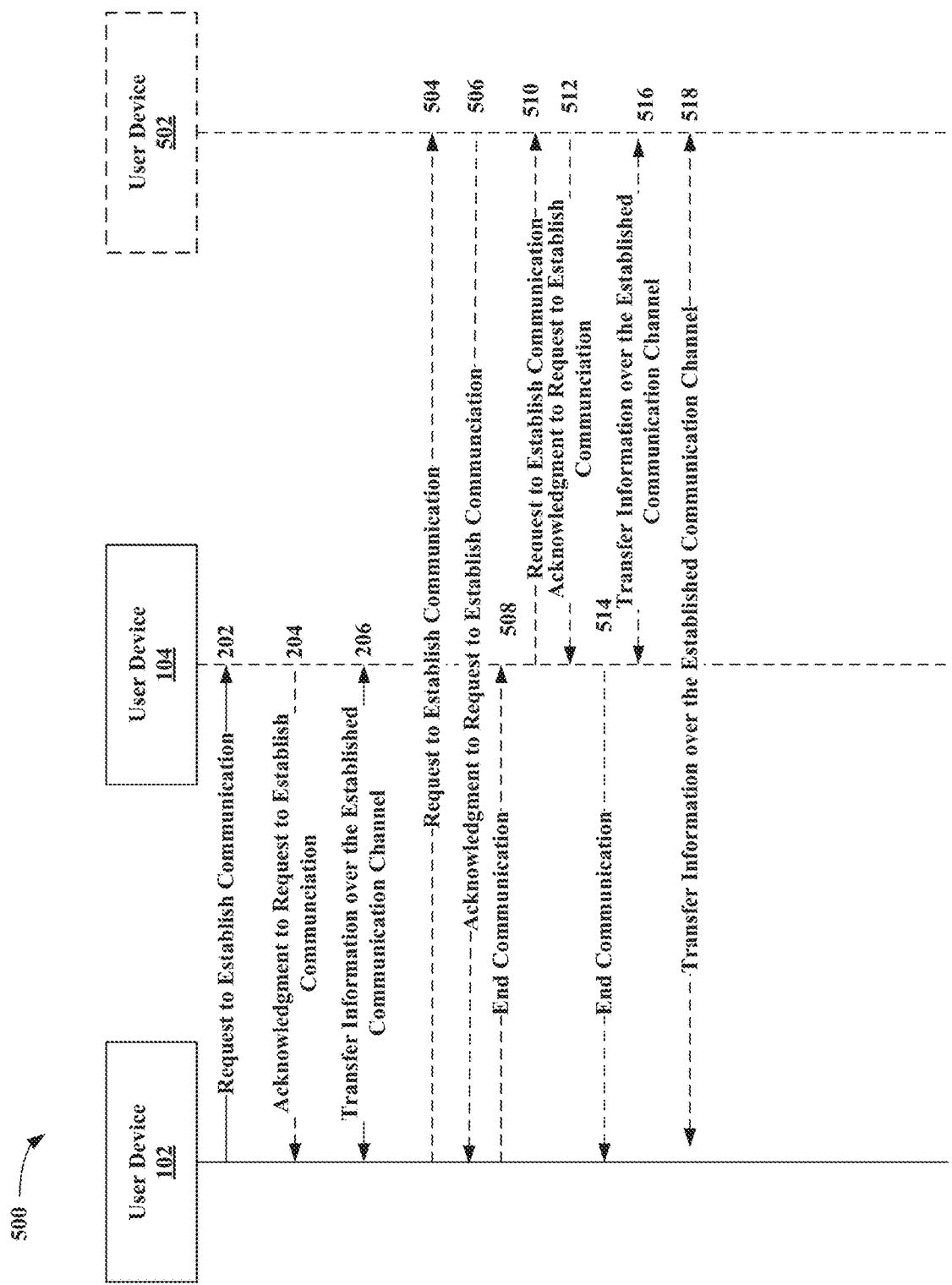
FIG. 5 is another diagram that illustrates a call flow in accordance with exemplary methods of the disclosure.

FIG. 2 is a diagram that illustrates a call flow 200 of the communication workspace system 100 in accordance with exemplary methods of the disclosure. FIG. 3 is a diagram that illustrates a call flow 300 of the communication workspace system 100 in accordance with exemplary methods of the disclosure. FIG. 4 is a diagram that illustrates a call flow 400 of the communication workspace system 100 in accordance with exemplary methods of the disclosure. FIG. 5 is a diagram that illustrates a call flow 500 of the communication workspace system 100 in accordance with exemplary methods of the disclosure.

Referring to FIGS. 1-5, in an exemplary embodiment, the instructions, in response to execution by the processor, may cause the processor to perform operations including establishing a communication (202, 204, 302, 304, 402-1, 402-2, 404-1, 404-2) between at least a first user device 102, 104 and a second user device 104, 102. For example, as illustrated in FIG. 2, establishing a communication between at least a first user device 102 and a second user device 104 may include the first user device 102 requesting to establish communication with the second user device 104 (202). As also illustrated in FIG. 2, establishing a communication between at least a first user device 102 and a second user device 104 may include the second user device 104 acknowledging the request to establish communication from the first user device 102 (204).

Furthermore, either first user device 102 or second user device 104 may establish the communication. Accordingly, as illustrated in FIG. 3, establishing a communication between at least a first user device 102 and a second user device 104 may include the second user device 104 making the request rather than the first user device 102 as was illustrated in FIG. 2. Thus, in FIG. 3, the initial functions (202. 204, 206; 302, 304, 306) performed by the first user device 102 and the second user device 104 are merely swapped.

More specifically, establishing a communication between at least a first user device 102 and a second user device 104 may include the second user device 104 requesting to establish communication with the first user device 102 (302). As also illustrated in FIG. 3, establishing a communication between at least a first user device 102 and a second user device 104 may include the first user device 102 acknowledging the request to establish communication from the second user device 104 (304).

As illustrated in FIG. 4, establishing a communication between at least a first user device 102 and a second user device 104 may include the server 106 requesting that the first user device 102 (402-1) and the second user device 104 (402-2) establish communication with each other (402). As also illustrated in FIG. 4, establishing a communication between at least a first user device 102 and a second user device 104 may include the first user device 102 (404-1) and the second user device 104 (404-2) acknowledging the request to establish communication from the server 106 (404).

Additionally, the processor may perform operations including transferring information between at least the first user device 102, 104 and the second user device 104, 102 within the communication (206, 306, 406-1, 406-2).

The processor to perform operations including presenting a representation of collaborative content, e.g., a file (208, 210, 308, 310, 408-1, 408-2) to the first user device 102, 104 and the second user device 104, 102.

The processor may receive a first user input (214, 318, 410, 412) from the first user device 102 during the communication.

Additionally, the processor may perform operations including receiving a second user input (218, 312, 416, 418) from the second user device 104 during the communication.

The processor may perform operations including updating the collaborative content, e.g., a file (216, 222, 316 320, 414, 420) during the communication based on the first user input (214, 318, 410, 412) and the second user input (218, 312, 416, 418).

In an exemplary embodiment, the communication includes at least one of audio, video, and online text and the collaborative content comprises at least one of a file being edited, computer code being written, or a presentation being developed.

In an exemplary embodiment, the processor may transfer the conference call from the second user device 104 to a third user device 502. In an exemplary embodiment, the processor may forward at least a subset of the information from the first user device 102 to a third user device 502. In an exemplary embodiment, establishing the communication between at least the first user device 102 and the second user device 104 further includes establishing the communication between the first user device 102, the second user device 104, and at least a third user device 502. In an exemplary embodiment, the processor may spawn a new conference call between the first user device and the third user device 502.

Accordingly, the first user device 102 may request to establish communication (504) with the third user device 502. Optionally, the third user device 502 may acknowledge the request to establish communication from the first user device 102 (506). Accordingly, the first user device 102 may, optionally, end communication with the second user device 104 (508). Similarly, the second user device 104 may request to establish communication (510) with the third user device 502. Optionally, the third user device 502 may acknowledge the request to establish communication from the second user device 104 (512). Accordingly, the second user device 104 may, optionally, end communication with the first user device 102 (514). Thus, the third user device 502 may transfer information (516, 518) over the established communication channel(s) with one or more of the first user device 102 (518) and the second user device 104 (516).

In an exemplary embodiment, communicating an indication of the first user device 102, 104, an indication of the second user device 104, 102, and the collaborative content for display within user interfaces of both the first user device 102, 104 and the second user device 104, 102.

In an exemplary embodiment, the communication includes at least one of a voice communication, a text communication, or a video conference communication.

An exemplary embodiment may display an indication of the first user device 102, 104, an indication of the second user device 104, 102, and the collaborative content within user interfaces of both the first user device 102, 104 and the second user device 104, 102.

As discussed above, a communication system 100 may include a first user device 102, 104 and a second user device 104, 102. The communication system 100 may be configured to establish a communication between at least the first user device 102, 104 and the second user device 104, 102, transfer information between at least the first user device and the second user device within the communication, present a representation of collaborative content to the first user device and the second user device, receive a first user input from the first user device during the communication, receive a second user input from the second user device during the communication, and update the collaborative content during the communication based on the first user input and the second user input.

As illustrated in FIG. 1, the communication system 100 may further include a server 106. The server 106 may establish the communication (108-1, 108-2, 110-1, 110-2) between at least the first user device 102. 104 and the second user device 104, 102, e.g., through the server 106. The server 106 may transfer information between at least the first user device 102, 104 and the second user device 104, 102 within the communication (108-1, 108-2, 110-1, 110-2). The server 106 may present the representation of the collaborative content to the first user device 102, 104 and the second user device 104, 102. The server 106 may receive the first user input from the first user device 102, 104 during the communication and the second user input from the second user device 104, 102 during the communication. Additionally, the server 106 may update the collaborative content during the communication based on the first user input and the second user input.

Figure 6:
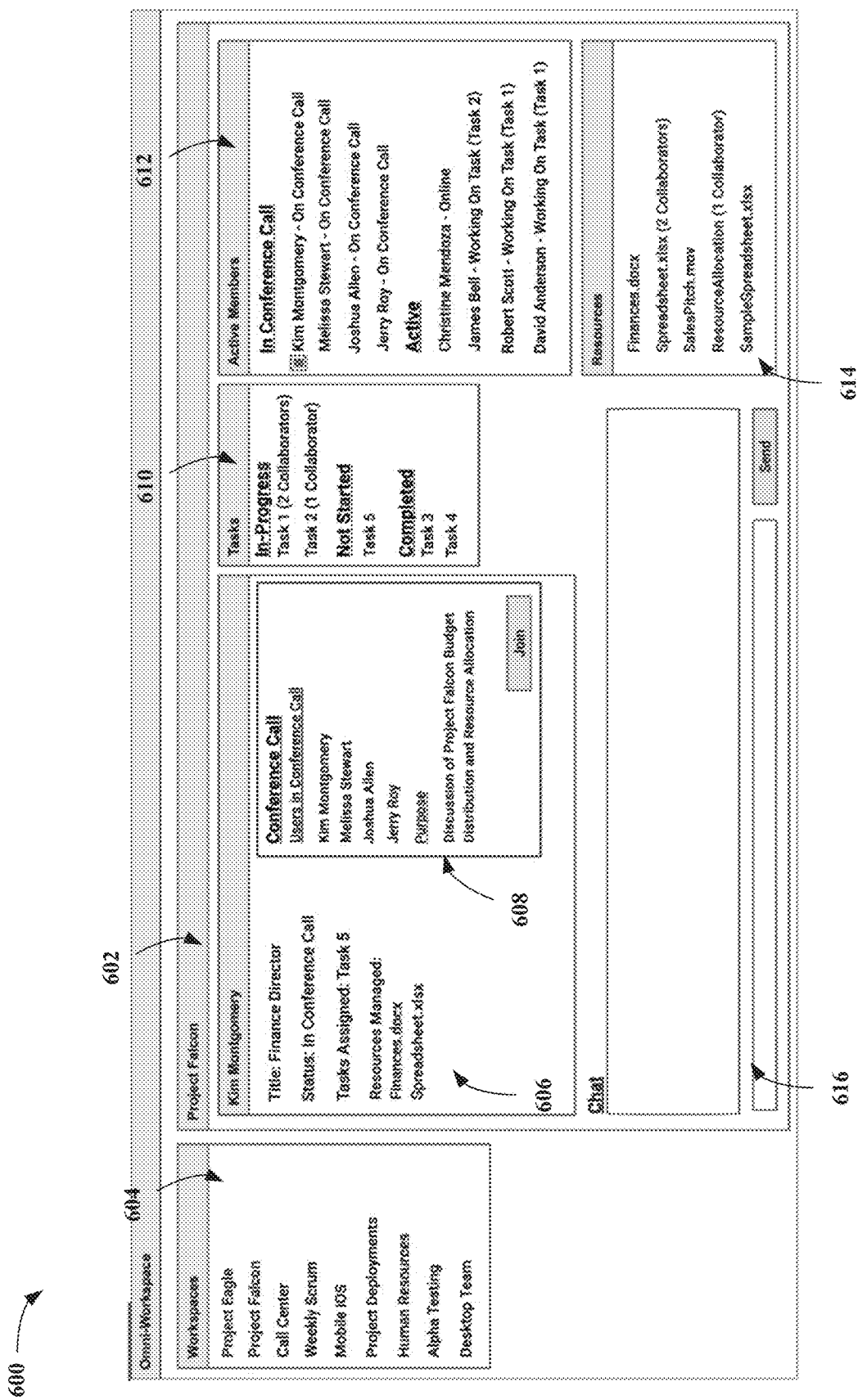
FIG. 6 is a diagram illustrating an example screenshot in accordance with exemplary methods of the disclosure.

FIG. 6 is a diagram illustrating an example screenshot 600 in accordance with exemplary methods of the disclosure. The example screenshot 600 includes example blocks that may be included in an omni-workspace 602. In some example embodiments, omni-workspaces 602 may include a subset of these blocks. Furthermore, other example embodiments may have other blocks that implement one or more other features of the omni-workspaces described herein. The example screenshot 600 illustrates a single open omni-workspace 602, "Project Falcon" and a list of available omni-workspaces 604.

The omni-workspace 602 includes a block 606 for a user "Kim Montgomery" of the device generating the screenshot. As illustrated in FIG. 6, the user is on a conference call (608) with multiple other users. Users may join and exit the conference call using controls on the screen. The omni-workspace 602 may track tasks 610 that may need to be performed for the project, e.g., "Project Falcon." For example, task 1 and task 2 may be in-progress. Task 5 may not be started. Task 3 and task 4 may be completed. Additionally, the block for tracking tasks 610 may track the number of people, e.g., collaborators, working on a task within a project. For example, two collaborators may be working on task 1. One collaborator, e.g., a single person, may be working on task 2. In other words, task 2 may be a task that can be completed by a single person or it may be that at that particular time only one person is working on that task (e.g., task 2). For example, the number of collaborators working on a task may be dynamic. The omni-workspace 602 may also include an active member block 612 that may be subdivided into members in conference calls and other active members, i.e., "active." The other active members may provide an indication of members that are online or an indication of what task the member is working on. Additionally, the omni-workspace 602 may include a list of resources 614 such as financial documents, spreadsheets, movies, and resource allocations. The list may indicate a number of collaborators working with a particular resource, e.g., in the illustrated example, two collaborators on a spreadsheet, one collaborator working on resource allocation.

The omni-workspace may also provide for users to have chats such as text chats with other users at block 616. A chat may refer to any kind of communication over a network such as the Internet or corporate network such as real-time transmission of text messages from sender to receiver. Chat messages may generally be short in order to enable other participants to respond quickly. The chat may address point-to-point communications as well as multicast communications from one sender to many receivers. In the illustrated embodiment, text chat may be used. In other examples, voice chat or video chat may be used. Furthermore, multiple features, in multiple blocks, may be in use at the same time. For example, a conference call and a chat may be occurring at the same time.

Figure 7:
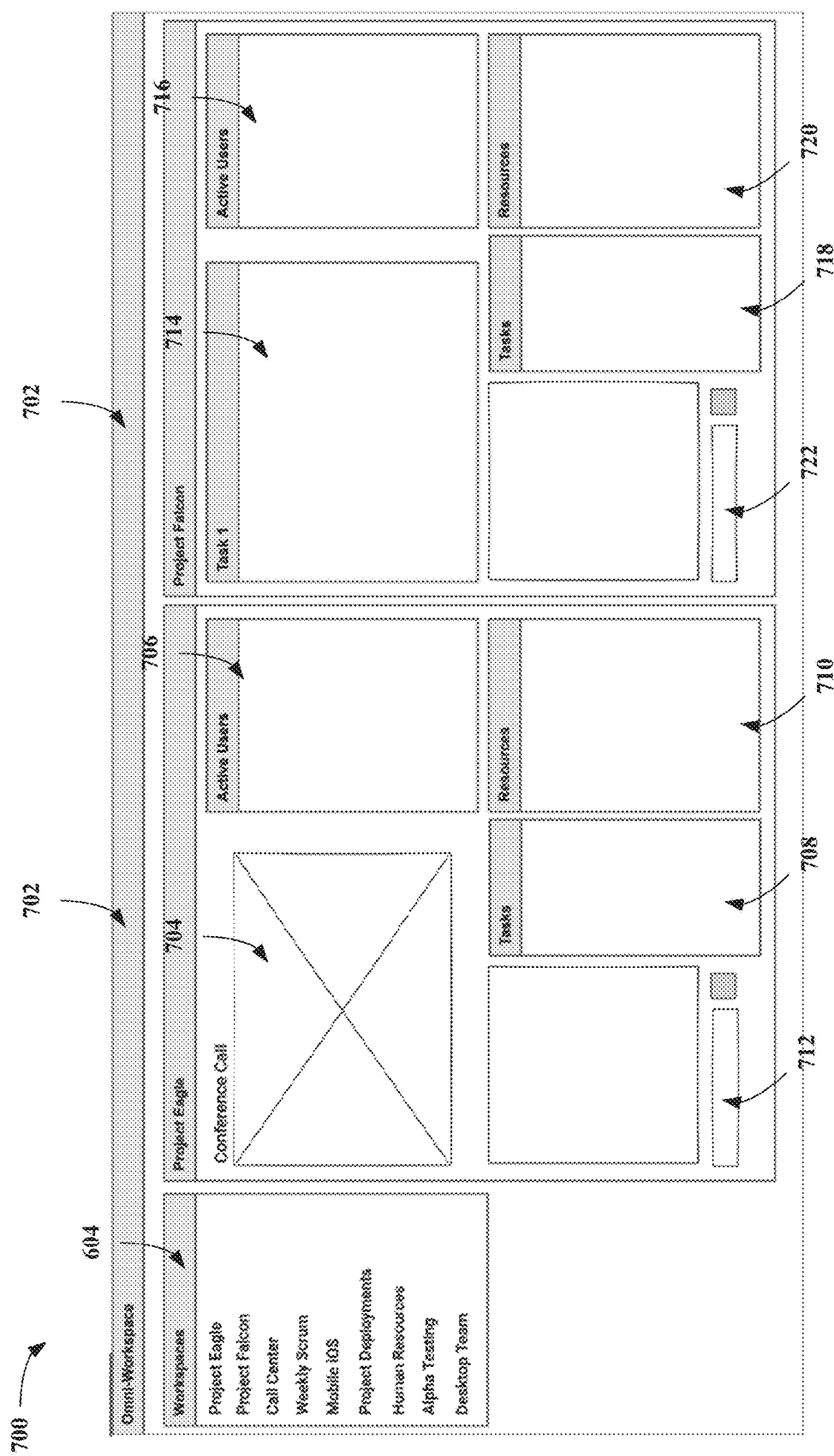
FIG. 7 is a diagram illustrating an example screenshot in accordance with exemplary methods of the disclosure.

FIG. 7 is a diagram illustrating an example screenshot 700 in accordance with exemplary methods of the disclosure. The screenshot 700 illustrates workspaces 604 as well as multiple projects 702, e.g., "Project Eagle" and "Project Falcon." In the illustrated example, Project Eagle includes blocks for a conference call 704, active users 706, tasks 708, resources 710, and chat 712. In the illustrated example, Project Falcon includes blocks for a task 714, active users 716, tasks 718, resources 720, and chat 722.

The screenshots 600, 700 of FIGS. 6 and 7 illustrate example screens of devices for conferencing and other collaborations that may allow for completing various projects, such as by updating of collaborative content during a communication. Implementations of collaboration-focused applications on the devices may leverage multiple media types, for example, audio, video, and online text (e.g., chat).

Figure 8:
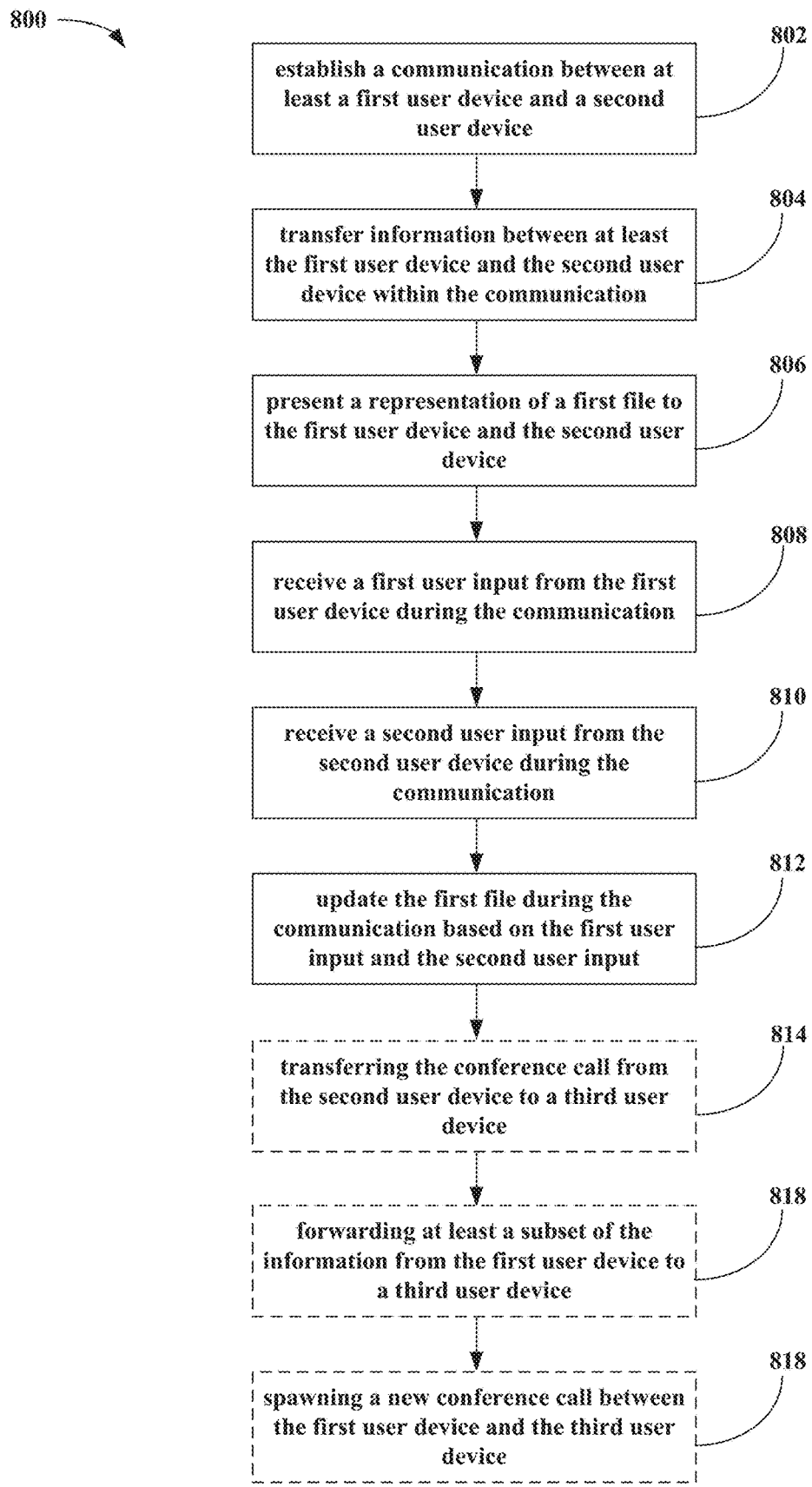
FIG. 8 is a flow diagram illustrating an example method.

FIG. 8 is a flow diagram illustrating an example method 800. The communication method 800 includes establishing a communication between at least a first user device and a second user device (802). The method 800 also includes transferring information between at least the first user device and the second user device within the communication (804). Additionally, the method 800 includes presenting a representation of collaborative content to the first user device and the second user device (806). The method 800 also includes receiving a first user input from the first user device during the communication (808). The method 800 also includes receiving a second user input from the second user device during the communication (810). Additionally, the method 800 includes updating the collaborative content during the communication based on the first user input and the second user input (812).

In an exemplary embodiment, the method 800 may include transferring the conference call from the second user device to a third user device (814). In an exemplary embodiment, the method 800 may include forwarding at least a subset of the information from the first user device to a third user device (816). In an exemplary embodiment, the method 800 may include spawning a new conference call between the first user device and the third user device (818).

Exemplary embodiments may include one or more of (1) an omni-workspace construct that embodies multiple participants with a shared objective and (2) a goal-oriented work environment that allow collaboration between members for robust communications while working on that common goal. The shared objective may be a project, task(s), or an event. Additionally, the ability to communicate may include advanced features or functions that are available to the workgroup members (e.g., conference, transfer, forward, or other communication system features). Furthermore, each member may spawn additional communication sessions as needed. The presence indication for the elements (e.g., presence of content, people, applications or other elements) within the display or dashboard may also be provided. In an aspect, all facets on the omni-workspace may be available to all members, meaning the concept of transparency applies so users may see all content, see which members are working on such content, and collaborate including dropping into conversations or meetings to learn more about the content. In other exemplary embodiments, one or more members may not be provided access to all facets on the omni-workspace. For example, some information may be limited to specific members, e.g., trade secrets or other sensitive information.

The ability to apply a particular collaborative state (e.g., transfer digital workspace, conference in another digital workspace, forward to another digital workspace or an individual, silent monitor by an entity or individual, or other collaborative state) to an enhanced digital workspace (or omni-workspace) that contains any number of users with a common purpose. Each workspace may include different communication types and content types.

Once a conference call, for example, is underway, again formed around a common purpose, then an exemplary embodiment may allow other omni-workspaces to (1) be added in or (2) be transferred to another workspace (e.g., "UX Team transferred to Development," "Wireless Sales conferences in Finance"). Actions to be performed may enhance the collaborative state.

In an exemplary embodiment, a workspace may be conferenced/transferred with both workgroup and workspace content. In another exemplary embodiment, activity-status may be enabled for a fellow collaborator. Accordingly, by selecting the collaborator's profile, a user may get a real-time view of what the collaborator is working on. The ability to view activity or status may be permitted based on what a person has agreed to include within the omni-workspace. Additionally, the systems and methods described herein may work in conjunction with portals like Confluence, Jira, or other portals.

The omni-workspace may extend the collaboration concept to include a shared workspace, communication capabilities, and the coordination of tasks for users with a common goal. Furthermore, the ability to change the collaborative state or collaboration state, such as invite workers to collaborate or transfer the workspace to an entirely different omni-workspace, allows users to quickly and efficiently spawn additional omni-workspaces. Thus, changing a collaborative state may occur by at least one of (1) forward at least a subset of the information from the first user device to a third user device or (2) transferring at least a subset of the information from a first workspace to a second workspace. Conference/transfer is just one example of a state condition that may be applied to an omni-conference. The omni-workspaces may facilitate both user to user interaction as well as giving users access to any content (e.g., spreadsheets or PowerPoint decks that may require multiple user input) needed for the collaborative goal of the omni-workspace.

The omni-workspace may allow for a fully transparent collaboration environment for the members of the omni-workspace. Members may be able to see real-time progress of tasks and files as well as contribute to the progress on the tasks and files. The omni-workspace may provide the functionality of many different collaboration tools together in one place with additional features such as transferring. This may allow for a highly efficient collaboration on a specific topic or group of topics. Transferring an omni-workspace may solve the issue of the large amount of overhead caused when a new group of members needs to work on an existing topic.

In the omni-workspace, when a primary conference call (e.g., a call with a "full team") is underway between participants, an exemplary embodiment may promote the ability to interact on the sidelines with other participants if they are present within the workspace. The omni-workspace may allow users to hold a secondary conference call inviting any participant while the primary conference is active. Any workgroup member may click on a call underway to "drop in" and enter that conference call. An "aggregation" based security policy may apply to the workspace, protecting the IP and preventing unauthorized communications with the outside. No known implementation as described creates a development environment that may be integrated with a conferencing facility. Traditionally, systems may use either chat, voice, or a combination of chat and voice. Possibly, a user may be able to add an attachment or see what's being presented (e.g., Skype, MiCollab, vidyo are examples), however the participants may only be able to watch, essentially the content may be streaming, e.g., a view of a PowerPoint deck being presented.

A collaboration-state may be conceptually similar to a voice call in features and/or functions, but in the context of a collaboration event with different rules of engagement that apply. All of the collaboration related activities that are underway for a workspace could be "transferred" from one workspace to another. In the case of a voice call, a traditional transfer may move the interaction between the originator and a participant to a new transferee (e.g., a participant receiving the call). This means that the conversation may be halted, until the transfer function applies, in which case the person receiving the transferred call could start a new conversation with the originator. The person receiving the call, therefore, may be able to pick up the voice call initiated by the originator.

With omni-workspaces, a transfer state may also end the respective communications between participants (e.g., assuming the task-conditions had been met), however the output from one workspace including the work itself (e.g., documents, presentations, code, or other work materials), the respective team members who collaborated within that workspace, and any reference files (e.g., FAQs, knowledge sources, or other reference files) may be transferred to a new workspace replete with the new workspace's own members, and/or other workspace data. The new workspace members become the transferees, and therefore they may be able to pick up the work underway by the previous workspace members. It may be feasible to reassign tasks to new members so that the transfer function essentially distributes tasks to new members with different functions within an organization.

In the event that a call is underway, it may be possible that, with omni-workspaces, a transfer state may not end the respective communications between participants and alternatively may maintain the conference state while allowing the members of the new "transferred" omni-workspace to observe that a conference call is underway and possibly join in (e.g., listening or otherwise interact directly).

Standard conferencing, e.g., by inviting participants to a conference, may be construed as being collaborative. There may be some debate regarding whether the older concepts of collaboration are that collaborative; regardless, the content and measurable outcomes of traditional conference calls are superficially "painted" on the meeting's purpose, minutes, or both the meeting's purpose and minutes with the older definition of a collaboration setting. However, omni-workspace based collaboration involves allowing participants to engage one another, share content, co-develop content, or some combination of these. Generally nothing in the collaborative environment is kept private, therefore all the experiences of the workgroup members may become purposefully relevant to any team member. Allowing for the collaboration may improve the workspace's ability to attain the "common goal" of the workspace. Generally, people may dislike not being invited to meetings they should have attended. This etiquette (or lack thereof) may be resolved by various exemplary embodiments. Furthermore, a proposed dashboard like display-view creates an interactive experience for the workspace members regarding the shared content in the omni-workspace (e.g. "In-progress;" "not started yet"). All the risks may be displayed, progress for teams, progress for members, and overall progress may be displayed. Additionally, wherever self-directed tasks may be required, or other items may also be displayed.

Therefore, inviting participants from another workspace results in new participants being integrated with the new workspace. Figuratively, this is not the same as having people arrive in a room that are not sure what to do because someone called a meeting with no agenda. Because of the action to apply to a new collaborative state such as conferencing in members (e.g., inviting to a new omni-workspace), the new omni-workspace members may be assigned incomplete tasks, tasks not yet started, relevant resources (e.g., content and/or people), audio or video conference sessions (e.g., both underway and/or planned), the ability to drop into meetings or chat with other team members, or some combination of these.

The three components that may allow this to happen may be the conferencing server, the file system database, and the workspace server. The conferencing server and file system database may be traditional implementations as much of an exemplary embodiment may be done through the workspace server. The workspace server may be responsible for coordinating workspaces that may be transferred in or out of the conference, and the scope of any created omni-workspaces and specific content that the workspace server may have access to.

The workspace server may be the one component that may be aware of which users may be a part of workspaces and which files those workspaces have access to. When a traditional conference is created, generally only users that may be a part of that workspace are alerted and given conference information, and only users of that workspace have access to content or files in that workspace. An exemplary embodiment may allow for other workspaces to be conferenced into an existing conference. Also, a provision may be added to include exceptional circumstances where some content or files may not be shared (confidential or not ready yet).

When a workspace is conferenced in, the users of that workspace may be alerted. In addition to the alert, the workspace server may create a workspace around the topic of the current conference. Normally, files and content scope may be restricted to the workspace itself, and when a user needs to see this content, the user must either be added to the workspace, or the content must be shared through an external means, which breaks any collaboration link the user has with the workspace. Omni-workspaces may allow access to content that users of each workspace in the conference may not have had access to initially. For example, access may be allowed to users who are "conferenced in" from other workspaces. In addition, the workspace based on a topic of the current conference, may also receive additional properties or characteristics regarding the "conferenced in" workspace while maintaining the primary topic underpinning the new combined workspace. (For example, new firmware upgrade process may be the main topic, however the conferenced in workspace embodies a workforce that has a disposition towards testing vs. development (the workspace that initiated the conference-in state). Omni-workspaces also provide a means to coordinate collaboration of the files and content on top of the existing conference audio functionality.

When a conference with an omni-workspace has ended, the workspace server may also provide functionality to consolidate the work that was done during the conference. The work may be delivered to the parties that were involved in the conference or an option for the omni-workspace to persist may also be possible.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be stand-alone or combined in any combination. Further, unless otherwise noted, various illustrated steps of a method may be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A communication method, comprising:
   establishing a communication between at least a first user device and a second user device;
   transferring information between at least the first user device and the second user device within the communication;
   presenting a representation of collaborative content to the first user device and the second user device, the collaborative content including at least a first task;
   receiving a first user input from the first user device during the communication;
   receiving a second user input from the second user device during the communication;
   updating the collaborative content during the communication based on the first user input and the second user input; and
   tracking the first task including tracking an amount of time of at least one of the first user working on the first task or the second user working on the first task, wherein information of the tracking presented within a collaborative environment of the representation of collaborative content.

2. The method of claim 1, wherein the communication comprises at least one of audio, video, and online text and the collaborative content comprises at least one of a file being edited, computer code being written, or a presentation being developed.

3. The method of claim 2, wherein the communication comprises audio and the audio comprises a conference call, the method further comprising transferring the conference call from the second user device to a third user device.

4. The method of claim 2, further comprising changing collaborative state by at least one of forwarding at least a subset of the information from the first user device to a third user device and transferring at least a subset of the information from a first workspace to a second workspace.

5. The method of claim 2, wherein establishing the communication between at least the first user device and the second user device further includes establishing the communication between at least the first user device, the second user device, and a third user device.

6. The method of claim 5, wherein the communication comprises audio and the audio comprises a conference call, the method further comprising spawning a new conference call between the first user device and the third user device.

7. The method of claim 1, further comprising displaying an indication of the first user device, an indication of the second user device, and the collaborative content within user interfaces of both the first user device and the second user device.

8. The method of claim 1, wherein the communication comprises at least one of a voice communication, a text communication, or a video conference communication.

9. The method of claim 1, wherein a server establishes the communication between at least the first user device and the second user device, the server transfers information between at least the first user device and the second user device within the communication, the server presents the representation of the collaborative content to the first user device and the second user device, the server receives the first user input from the first user device during the communication and the second user input from the second user device during the communication, and the server updates the collaborative content during the communication based on the first user input and the second user input.

10. The method of claim 9, wherein the first user device acts as the server.

11. A communication device, comprising:
    a processor; and
    a tangible, non-transitory memory configured to communicate with the processor, the tangible, non-transitory memory having instructions stored thereon that, in response to execution by the processor, cause the processor to perform operations comprising:
       establishing a communication between at least a first user device and a second user device;
       transferring information between at least the first user device and the second user device within the communication;
       presenting a representation of collaborative content to the first user device and the second user device, the collaborative content including at least a first task and a second task;
       receiving a first user input from the first user device during the communication;
       receiving a second user input from the second user device during the communication;
       updating the collaborative content during the communication based on the first user input and the second user input; and
       tracking the first task including tracking an amount of time of at least one of the first user working on the first task or the second user working on the first task, wherein information of the tracking presented within a collaborative environment of the representation of collaborative content.

12. The communication device of claim 11, wherein the communication comprises at least one of audio, video, and online text and the collaborative content comprises at least one of a file being edited, computer code being written, or a presentation being developed.

13. The communication device of claim 12, the tangible, non-transitory memory having additional instructions stored thereon that, in response to execution by the processor, cause the processor to transfer the conference call from the second user device to a third user device.

14. The communication device of claim 12, the tangible, non-transitory memory having additional instructions stored thereon that, in response to execution by the processor, cause the processor to changing collaborative state by at least one of forward at least a subset of the information from the first user device to a third user device and transferring at least a subset of the information from a first workspace to a second workspace.

15. The communication device of claim 12, wherein establishing the communication between at least the first user device and the second user device further includes establishing the communication between the first user device, the second user device, and at least a third user device.

16. The communication device of claim 15, wherein the communication comprises audio and the audio comprises a conference call, the tangible, non-transitory memory having additional instructions stored thereon that, in response to execution by the processor, cause the processor to spawn a new conference call between the first user device and the third user device.

17. The communication device of claim 11, further comprising communicating an indication of the first user device, an indication of the second user device, and the collaborative content for display within user interfaces of both the first user device and the second user device.

18. The communication device of claim 11, wherein the communication comprises at least one of a voice communication, a text communication, or a video conference communication.

19. A communication system, comprising:
a first user device; and
a second user device, the communication system:
   establishing a communication between at least the first user device and the second user device;
   transferring information between at least the first user device and the second user device within the communication;
   presenting a representation of collaborative content to the first user device and the second user device, the collaborative content including at least a first task and a second task;
   receiving a first user input from the first user device during the communication;
   receiving a second user input from the second user device during the communication;
   updating the collaborative content during the communication based on the first user input and the second user input; and
   tracking the first task including tracking an amount of time of at least one of the first user working on the first task or the second user working on the first task, wherein information of the tracking presented within a collaborative environment of the representation of collaborative content.

20. The communication system of claim 19, further comprising a server, wherein a server establishes the communication between at least the first user device and the second user device, the server transfers information between at least the first user device and the second user device within the communication, the server presents the representation of the collaborative content to the first user device and the second user device, the server receives the first user input from the first user device during the communication and the second user input from the second user device during the communication, and the server updates the collaborative content during the communication based on the first user input and the second user input.

* * * * *